Patented Apr. 1, 1930

1,752,838

UNITED STATES PATENT OFFICE

FRANCIS M. CROSSMAN, OF NEW YORK, N. Y.

BINDER FOR FUEL AGGLOMERATES

No Drawing. Application filed December 5, 1924. Serial No. 754,201.

This invention relates, particularly to processes and means for binding compressed fuels, and has for its main object to provide compressed fuels, usually known as boulettes, briquettes, etc., of any shape and made of practically of any pulverulent fuels, which will not add to the smoke producing elements contained in the fuel utilized, and which will be water and weatherproof.

Many attempts have been made to produce compressed fuels from various coals available for such purposes, but none of the resulting boulettes or briquettes embody all of the above characteristics and desired qualities.

The ingredients and the process by which I obtain all of the above mentioned objects, are as follows.

Preparatory to the agglomeration of the fuel dust by my process, the pulverized fuel is first subjected to a drying operation to substantially eliminate all moisture from same. The dried coal is then brought into a mixing apparatus and my special binder is added therein in a colloidal semi-fluid state.

I have found that the special binder which, in combination with the usual mixing and drying processes, will produce a fuel agglomerate embodying my invention, will preferably be prepared as follows:

Firstly:—I take one hundred parts by weight of raw starch or any farinaceous material containing starch and gluten and dissolve it in 1000 parts by weight of cold water.

Secondly:—To this milky solution is added a small percentage of sodium nitrate intended to act primarily as an oxidizing agent in my finished product. The amount of the same depends on the character and analysis of the coal used, and the further object of its presence is also to make practically smokeless the combustion of the oil residues which I use, as well as any other material which I use in the preparation of my special binder. It is obvious that the sodium nitrate may be replaced by any other similar oxidizing agent like potassium nitrate, potassium permanganate, etc.

Thirdly:—The mixture is then brought to a boiling point until the starch material will result in a heavy flowing paste. For the purpose of retaining the solution in this semifluid state and also to obtain a greater cohesive efficiency in the subsequent combined materials at small expense, I now add to the mixture so far obtained sulphite cellulose liquor of 25–30 Bé., about 500 parts by weight. I may, however, use instead of the sulphite cellulose liquor, a liquid obtained in the distillation of corn husks known as "furfurol", preferably in a strength of 20–25 Bé. The sulphite cellulose liquor which I use, preferably is the waste liquor produced in the manufacture of sulphite wood pulp and I prefer to use sulphite cellulose liquor which is well known in the art as "neutralized liquor" and in which the acids have been previously neutralized by any appropriate means, as by the addition of lime, or if no sediment is desired, then with caustic soda.

Fourthly: While the water soluble binder mixture of the above ingredients is kept heated, I incorporate into it, as a water proofing agent, asphaltum, or pitch, obtained in the distillation of petroleum tar or coal tar, as a residuum, which are of solid consistency at normal temperatures but which I melt down to a freely flowing liquid.

My complete binding mixture is then thoroughly stirred for homogeneous dissemination of the asphaltum or pitch materials mentioned hereinbefore throughout the mixture and is ready for mixing with the coal dust.

One of the preferred proportions of the ingredients in preparing my binder mixture for compressed fuels is as follows.

100 lbs. of starch with 1000 lbs. of water added to it to dissolve the same.

1 pound of sodium nitrate.

500 pounds of sulfite cellulose liquor 30° Bé.

400 pounds of asphaltum pitch.

The amount of binder used is approximately from 4% to 6% in weight of the coal used, depending on the nature and quality of the coal.

While the quantities of materials herewith indicated are given, I do not bind myself to these in an exact form, as some materials used might decrease or increase as conditions might require, depending upon the type of coal used.

What I claim as new, is:—

1. A binder for making briquettes from pulverulent fuels comprising a mixture of sulphite cellulose waste liquor in an aqueous starch solution together with asphaltum pitch as a waterproofing material and a small amount of sodium nitrate as an oxidizing agent.

2. A binder for making fuel agglomerates consisting of a solution of a farinaceous material, a relatively large amount of sulphite cellulose liquor, a relatively large amount of a heavy oil residuum as a waterproofing agent and a relatively small amount of an oxidizing agent.

3. A binder for making fuel agglomerates consisting of a solution of a farinaceous material, a relatively large amount of sulphite cellulose liquor, a relatively large amount of a heavy oil residuum as a waterproofing agent and a relatively small amount of sodium nitrate.

4. A binder for fuel agglomerates consisting of approximately one hundred parts of starch gelatinized in water, one part of sodium nitrate, five parts of sulphite cellulose liquor, and four hundred parts by weight of heavy oil residuum.

5. Briquettes consisting of anthracite fines agglomerated by a binder containing starch, sulphite cellulose liquor, an oxidizing agent and a heavy oil residuum.

Signed at New York, in the county of New York and State of New York, this 2nd day of December, 1924.

FRANCIS M. CROSSMAN.